(12) United States Patent
Depta

(10) Patent No.: US 7,447,842 B2
(45) Date of Patent: Nov. 4, 2008

(54) MASS MEMORY DEVICE AND METHOD FOR OPERATING A MASS MEMORY DEVICE

(75) Inventor: Robert Depta, Augsburg (DE)

(73) Assignee: Fujitsu Siemens Computers GmbH, München (DE)

( * ) Notice: Subject to any disclaimer, the term of this patent is extended or adjusted under 35 U.S.C. 154(b) by 294 days.

(21) Appl. No.: 10/872,683

(22) Filed: Jun. 21, 2004

(65) Prior Publication Data

US 2004/0260872 A1 Dec. 23, 2004

(30) Foreign Application Priority Data

Jun. 20, 2003 (DE) .................................. 103 27 955

(51) Int. Cl.
*G06F 12/00* (2006.01)

(52) U.S. Cl. ........................................ 711/119; 711/141

(58) Field of Classification Search ........................ None
See application file for complete search history.

(56) References Cited

U.S. PATENT DOCUMENTS

| | | | |
|---|---|---|---|
| 5,819,054 A | | 10/1998 | Ninomiya et al. |
| 6,065,077 A | * | 5/2000 | Fu .............................. 710/100 |
| 6,081,883 A | * | 6/2000 | Popelka et al. ................. 712/28 |
| 6,134,624 A | | 10/2000 | Burns et al. |
| 6,571,321 B2 | | 5/2003 | Rowlands et al. |
| 6,571,324 B1 | * | 5/2003 | Elkington et al. ........... 711/162 |
| 7,010,575 B1 | | 3/2006 | MacArthur et al. |
| 2002/0078292 A1 | | 6/2002 | Chilton |
| 2002/0188786 A1 | | 12/2002 | Barrow et al. |
| 2004/0024941 A1 | * | 2/2004 | Olarig et al. ................. 710/302 |

FOREIGN PATENT DOCUMENTS

| | | |
|---|---|---|
| DE | 101 16 337 | 10/2001 |
| DE | 101 24 482 A1 | 12/2001 |

OTHER PUBLICATIONS

Search Report dated Mar. 5, 2007 issued for corresponding European Patent Application No. EP 04 01 2137.
Examination Report dated Mar. 4, 2008 issued for the corresponding German Patent Application No. 103 27 955.5-53.

* cited by examiner

*Primary Examiner*—Than Nguyen
(74) *Attorney, Agent, or Firm*—Cohen Pontani Lieberman & Pavane LLP

(57) ABSTRACT

A mass memory device (1) having a plurality of mass memories (2) and having at least two bridge controllers (3) which are coupled to the mass memories (2) by a data bus. A first common cache memory unit (4) is provided, to which the bridge controllers (3) are connected by means of an additional cache synchronization system for the purpose of storing and synchronizing data which are to be stored. A method is provided for operating a mass memory device (1) having a plurality of mass memories (2) and having at least two bridge controllers (3) which can be used to address the mass memories (2), and at least one first common first common cache memory unit (4) which is associated with the bridge controllers (3). All data to be stored are initially stored on the first common cache memory unit (4) and are automatically mirrored on an optional further common cache memory unit (4). The data initially stored in the first common cache memory unit (4) are transferred to the mass memories (2) for storage therein.

22 Claims, 2 Drawing Sheets

MASS MEMORY DEVICE AND METHOD FOR OPERATING A MASS MEMORY DEVICE

RELATED APPLICATIONS

This patent application claims the priority of German patent application 103 27 955.5, the disclosure content of which is hereby incorporated by reference.

FIELD OF THE INVENTION

The invention relates to a mass memory device having a plurality of mass memories and having at least two bridge controllers which are physically connected to the mass memories by means of a data bus. The invention also relates to a method for operating a mass memory device having a plurality of mass memories and having at least two bridge controllers which can be used to address the mass memories.

BACKGROUND OF THE INVENTION

Such mass memory devices are known. They have a multiplicity of mass memories, usually hard disks, and also components such as bus controllers and bridge controllers, which manage the mass memories and control the internal and external data transmissions on the basis of the requirement of servers which are connected to the mass memory devices by means of a host interface. The mass memory devices are normally used in a housing having a standard size, usually in what are known as 19" device cabinets.

The total storage capacity of a mass memory device is determined by the dimensions of the housing cage and of the number of mass memories which are arranged within the housing cage. Hence, the number of mass memories which can be integrated within the housing cage is dependent on the size of the mass memories themselves. Progressive further development of the mass memories achieves smaller physical dimensions as the capacity becomes greater.

The servers' increasing demands on storage capacity result in the provision of further mass memory devices or at least in changeover to mass memories having a greater capacity. The result of this is that, for example when changing over from 3.5" hard disks to 2.5" hard disks without any significant mechanical alterations to the housing cage, the number of integratable hard disks, as shown by way of example in FIG. 3 using an insert in a device cage, in a mass memory device may be increased by a multiple. Comparing the size of the mass memories relative to one another shows that the necessary installation space for a 3.5" hard disk in a horizontal position (interface for connection to the hard disk bus on the outside left) is equivalent to the installation space for two 2.5" hard disks in a vertical position (interface at the bottom). In popular mass memory devices with 19" standard system sizes, the number of available hard disks can thus be increased from 14 to at least 40.

The mass memories integrated in the external mass memory device, that is to say outside a server system, are not addressed directly via a host bus adapter in a host system, but rather can be managed using the bridge controllers and can be physically addressed by the latter. In an enterprise network environment, two bridge controllers are normally used in a mass memory device for reasons of redundancy for the system configuration used and for reasons of the number of mass memories which are to be managed. In this case, the bridge controllers can be operated differently depending on their configuration.

In an "active-active" configuration, the two bridge controllers have been activated, which means that both bridge controllers are able to access all of the mass memories integrated in the mass memory device. In this configuration, the two bridge controllers can be connected to different servers, which means that a plurality of servers can physically access a common mass memory pool and can thus be allocated to a server having greater memory resources.

In an "active-passive" configuration, only one bridge controller is ever active toward the host system and accesses all of the mass memories. The second bridge controller has an inactive status as a reserve system and is activated only in the event of failure of the active bridge controller itself. If a mass memory device has more than two bridge controllers available, these can also be operated in a mixed configuration.

Data to be stored can be stored on the mass memories on the basis of a requirement from a server connected to the mass memory device using the bridge controllers in two different ways:

in a "write back mode", data to be stored are first written to a memory area (cache) arranged within the bridge controller and then successful storage is immediately confirmed to the server (host); however, the data are written to the mass memories at a later time, for example as soon as the appropriate mass memories are able to accept these data, or in a "write through mode", data to be stored are written directly to the mass memories; this is followed by acknowledgement to the server.

In the "write back mode", the data to be stored are available for a particular period only in the data cache memory area of the bridge controllers. For this reason, it is particularly important, for example in the event of a power failure, to protect this memory area from data losses. To this end, each bridge controller is usually provided with a BBU (Battery Backup Unit) unit.

In an "active-active" or "active-passive" configuration for a first and further bridge controller with a configured "write back mode", the data to be stored are first written to the memory area of the bridge controller which is active for this data transaction. So that, in the event of the first bridge controller malfunctioning, the further bridge controller can adopt the full functionality transparently and without interruption, the data contents in the memory areas of the two bridge controllers need to be kept coherently. This requires permanent synchronization of the contents of the memory areas, which is known as cache coherency. This "cache synchronization" is normally performed using a data bus, usually the FC (Fiber Channel) or SCSI (Small Computer System Interface) hard disk bus.

In mass memory devices whose hard disk data bus is based, by way of example, on SAS (Serial Attached SCSI) or Serial ATA technology, some wires/lines are reserved for special purposes which could be used to reserve or set up a dedicated channel for synchronizing the data contents of the memory areas in the first and further bridge controllers. However, this is not standardized. Current standardization efforts, such as SATA II, are concentrated only on the interfaces between two bridge controllers arranged in a mass memory device.

FIG. 2 shows a known arrangement for a mass memory device 1. The mass memories 2 integrated in the mass memory device 1 can be addressed by the two bridge controllers 3. The bridge controllers 3 have internal cache memory areas 40 to which data to be stored are written in a "write back mode" configuration, and internal BBUs 5. A cache coherency bus system 60 is used to synchronize the data contents of the cache memory areas 40. The cache coherency bus system 60 is not necessarily an independent device. Often its functionality is undertaken by the hard disk bus (not shown here).

If a mass memory device 1, as shown in FIG. 4, contains a multiplicity of bridge controllers 3, each having a cache memory area 40 and a BBU 5, for managing mass memories 2, all of the bridge controllers 3 using the cache coherency bus system 60 (which again can be the hard disk bus) in order to synchronize the data contents and data status of their cache memory area 40 both when writing to the mass memories 2 and when reading from the mass memories 2.

There is a much greater level of data traffic, which has a multiple of the total bandwidth of the host interface arranged on the mass memory device for the purpose of connecting servers. In addition, a BBU needs to be provided for each bridge controller in order to protect against data losses in the event of a power failure, and this results in further costs, on the one hand, and, particularly in the case of external systems, in additional installation space being required in the mass memory device, on the other.

SUMMARY OF THE INVENTION

One object of the present invention is to provide a mass memory device and a method for operating a mass memory device which do not have the aforementioned drawbacks.

This and other objects are attained in accordance with one aspect of the present invention directed to a mass memory device comprising a plurality of mass memories, at least two bridge controllers coupled to the mass memories by a data bus, and a first common cache memory unit. A cache synchronization system couples the bridge controllers to the first common cache memory unit for synchronizing data which are to be stored on the mass memory units.

Another aspect of the present invention is directed to a method for operating a mass memory device having a plurality of mass memories, at least two bridge controllers which can be used to address the mass memories, and at least one first common cache memory unit associated with the bridge controllers. All data to be stored in the mass memories are initially stored on the first common cache memory unit, and the data stored in the first common cache memory unit are then stored in the mass memories.

Because the common memory unit is provided for the bridge controllers, the individual bridge controllers do not have separate internal cache memory areas, which are required for the cache coherency data operations. The individual bridge controllers always operate in "write back mode" and write data which are to be stored to the common cache memory unit via a separate data bus. This separate data bus, the cache synchronization system, has a single connection, a "point-to-point connection", to the common cache memory unit for each bridge controller and is in the form of a passive backplane connection, for example in the form of a multiple differential pair connection (XAUI, PCI Express), on the backplane which connects the bridge controllers. The cache synchronization system or a single connection may also be implemented as an optical connection. Depending on the number of bridge controllers needing to be connected to the cache memory units, the interface technology of the memory units allows a connection using switch fabric routing or shared bus topology. These topologies are extensively known to a person skilled in the art and are not explained in more detail at this point.

One particularly advantageous refinement of the invention provides a further common cache memory unit, which is connected to the first common cache memory unit by means of a separate connection in order to synchronize the common cache memory unit contents. In the event of a component failing, the data in the common cache memory contents are coherent, which means that there is transparent adoption by the further remaining cache memory unit.

Managing the coherency of the common cache memory unit and the further common cache memory unit is a much simpler matter than managing the coherency of a plurality of cache memories which are located in a plurality of bridge controllers.

It is found to be particularly advantageous if the common cache memory unit is in the form of a modular system which has a particular number of memory modules. It is a simple matter to increase the storage capacity of the common cache memory units by connecting further memory modules or to reduce it by removing memory modules. Faulty modules can easily be replaced during ongoing operation.

The common cache memory units have associated BBUs in order to protect against data losses in the event of a power failure. Previous BBUs associated with the bridge controllers are dispensed with, since data to be stored are written exclusively to the memory units. It is thus possible to save considerable costs and installation space with mass memory devices having a plurality of bridge controllers, while increasing the reliability of the system.

The use of central common cache memory units allows the internal memories in the bridge controllers to be reduced to a minimum.

DETAILED DESCRIPTION OF THE DRAWINGS

Figure 1:
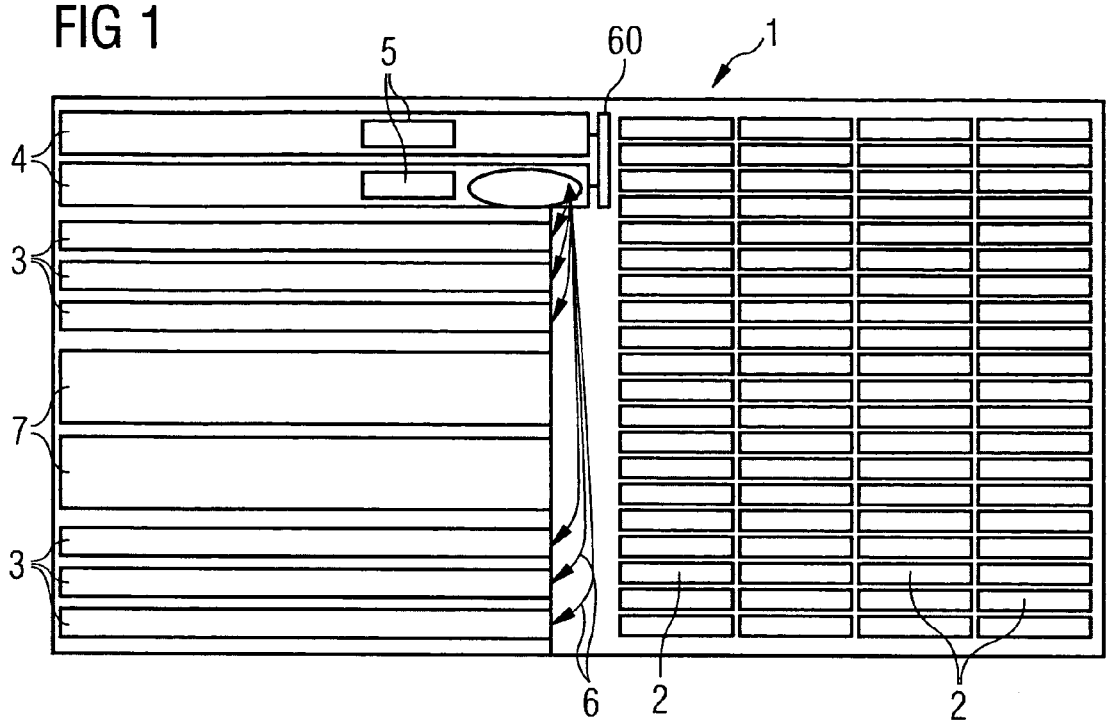
FIG. 1 shows an exemplary embodiment of the invention.
Figure 2:
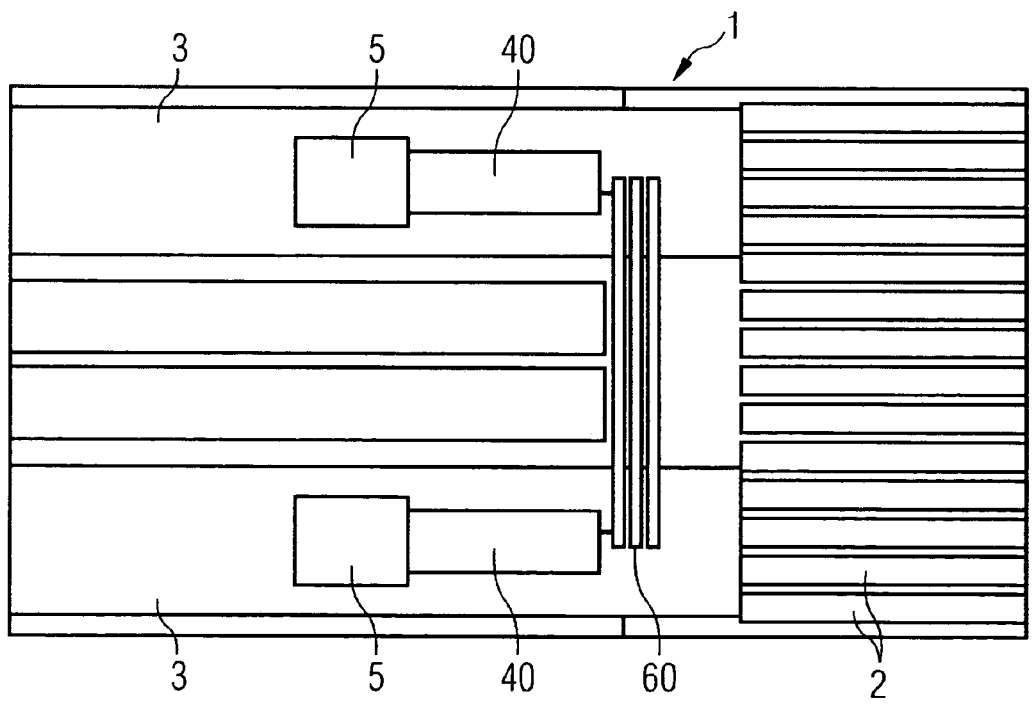
FIG. 2 shows a known arrangement for a mass memory device.
Figure 3:
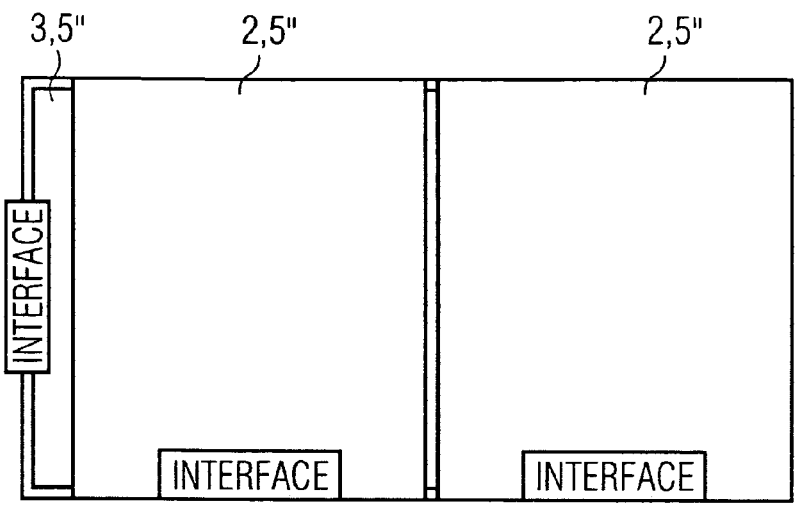
FIG. 3 shows relative sizes of known mass memories.
Figure 4:
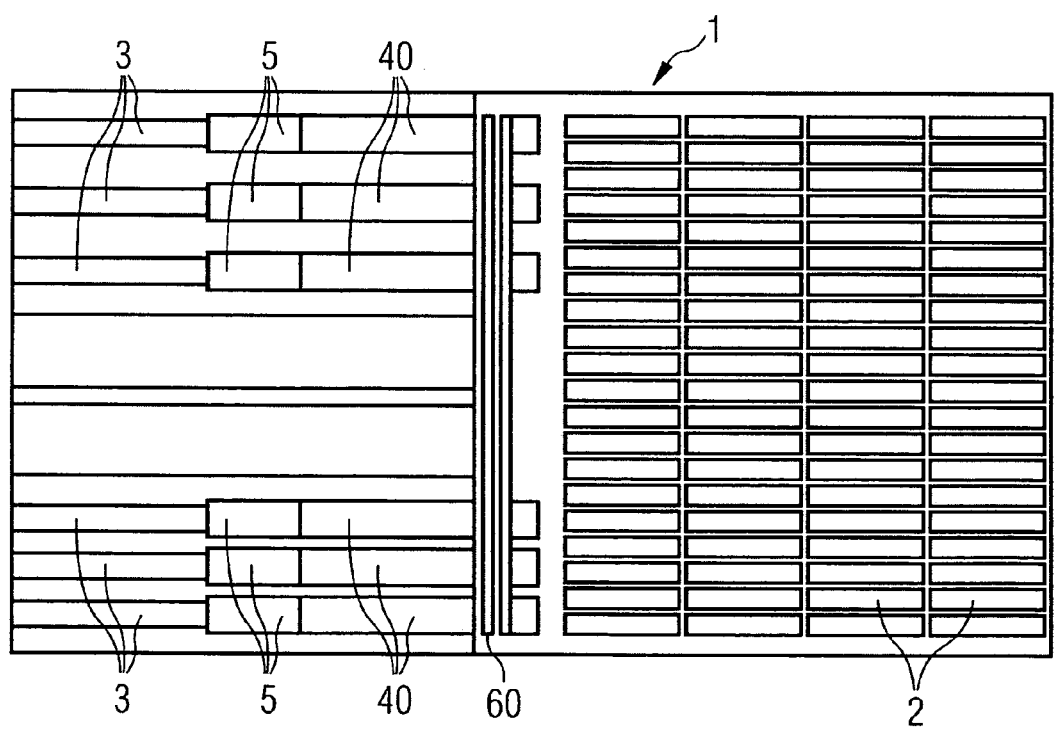
FIG. 4 shows a further known arrangement for a mass memory device.

FIG. 1 shows an inventive embodiment of a mass memory device. A mass memory device 1 has a multiplicity of vertically positioned 2.5" mass memories 2 and also a plurality of bridge controllers 3, which use a hard disk bus (not shown here) to address and manage the mass memories 2. The mass memory device 1 also contains a first and a further common cache memory unit 4, which each have an integrated BBU 5. To link the bridge controllers 3 to the common cache memory units 4, the mass memory device 1 has a separate cache synchronization system 6. The cache synchronization system 6 comprises a plurality of ultrafast single connections, by means of which the individual bridge controllers 3 are linked to the common cache memory units 4 in star form. To achieve a high level of availability in the event of fluctuations in the power supply, two redundant power supplies 7 are provided.

The bridge controllers 3 have neither internal, private cache memory units for storing data which are to be stored nor internally or externally associated BBUs. The fact that the bridge controllers 3 have a first common cache memory unit 4 associated with them means that data which are to be stored or read are written to the first common cache memory unit 4. Only then are they written to the mass memories 2. The two common cache memory units 4 are connected by means of a separate cache coherency bus system 60 which is used for the automatic cache synchronization of the content of the first and the further common cache memory unit 4.

The cache synchronization with the bridge controllers 3 is performed on the basis of a required security level using a "cache coherency algorithm", for example "DRAGON", "MSI", "MESI", "MOESI" etc. Hence, in the event of failure of one of the common cache memory units 4, system data coherency for the common cache memory unit contents is assured. The cache management function can be adopted by the further common cache memory unit 4 transparently and without interruption in an error situation.

The common cache memory units 4 have memory modules (not shown here). The storage capacity of the common cache memory units 4 can easily be extended or reduced by connecting further memory modules or by removing memory modules which have already been installed. Similarly, the memory modules can be replaced. When removing or connecting the cache memory modules or an individual common cache memory unit 4 during operation, in which case at least two common cache memory units 4 need to be operated in the mass memory device 1, no "cache flush" needs to be performed, which means that the bridge controllers 3 remain in a "write back mode" and, when one of the common cache memory units 4 is removed, the data to be stored are first written to the remaining common cache memory unit 4 and are then stored on the mass memories 2.

In a configuration with just one common cache memory unit 4, failure on account of an error or when this common cache memory unit 4 is removed prompts a "cache flush" to be performed, and the bridge controllers 3 switch to a "write through mode", in which the data to be stored are stored directly on the mass memories 2.

Data to be stored are written to the common cache memory units 4 in blocks including a CRC (cyclic redundancy check) check number. In the event of a block failing or in the event of a stipulated error level being exceeded, the common cache memory units 4 are capable of re-mapping the data which are to be stored using a part of their memory reserved for this purpose.

Particularly in the case of an "active-active" configuration for the bridge controllers, the particular refinement of the mass memory device allows all of these bridge controllers to be connected to different servers. The effect achieved by this is that, as the number of bridge controllers increases, a plurality of individual servers can be granted access to the extensive common memory resources. Equally, a plurality of bridge controllers can be coupled to one large server unit in order to speed up the mass memory access operations or else to assign separate hardware data transmission channels to ongoing processes separately. The option of connecting a plurality of bridge controllers to a plurality of server units increases the reliability in terms of failure of the overall system, since access to a common database is also protected by means of a bridge controller fail over without noting any significant performance losses.

Even the fact that the common cache memory units synchronize their memory contents using a separate data bus does not adversely affect the performance of the overall system. Only the common cache memory units and the separate cache synchronization system allow an "active-active" configuration with a plurality of bridge controllers to be set up without losses of performance, on account of the cache coherency processes running in the background.

The amount of data traffic for cache coherency operations does not increase linearly with respect to the number of cache memories, but follows a power law instead. Therefore, systems today very seldom operate with more than two simultaneously active bridge controllers.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

The invention claimed is:

1. A method for operating a mass memory device having a plurality of mass memories and at least two bridge controllers which can be used to address the mass memories, the method comprising the steps of:
   providing a first common cache memory unit associated with the at least two bridge controllers and a second common cache memory unit associated with the first common cache memory unit, each of said first and second common cache memory units being not internal to any of the at least two bridge controllers;
   initially storing on the first common cache memory unit all data to be stored in the mass memories; and then
   storing in the mass memories the data initially stored in the first common cache memory unit,
   wherein the data to be stored in the first common cache memory unit are mirrored on the second common cache memory unit, and
   wherein the second common cache memory unit adopts the functionality of the first common cache memory unit transparently and without delay in the event of failure of the first common cache memory unit.

2. The method as claimed in claim 1,
   wherein
   the data to be stored are mirrored on the second common cache memory unit using a cache coherency algorithm which is based on a required security level.

3. The method as claimed in claim 1,
   wherein
   the at least two bridge controllers are operated in a "write back mode", such that the data to be stored which are present on one of the at least two bridge controllers are stored not on a memory which is internal to said one of the at least two bridge controllers but rather on the first common cache memory unit.

4. The method as claimed in claim 1,
   wherein
   the first and second common cache memory units are incorporated in a memory subsystem manager for management purposes.

5. The method as claimed in claim 1,
   wherein
   the data stored in the first and further common cache memory units are protected against errors by means of protection algorithms for data reconstruction.

6. The method as claimed in claim 1,
   wherein
   the data to be stored are stored in the first and second common cache memory units in blocks, and the first and second common cache memory units have self-restoring properties which, in the event of failure of a block or in the event of a stipulated error level being exceeded, automatically map the data to be stored in a reserved block and do not use the faulty block further.

7. The method as claimed in claim 1,
   wherein
   status of the data to be stored in the mass memories is initially stored in the first common cache memory unit and then stored in the mass memories.

8. A method for operating a mass memory device having a plurality of mass memories and at least two bridge controllers which can be used to address the mass memories, the method comprising the steps of:

providing a first common cache memory unit associated with the at least two bridge controllers and a second common cache memory unit associated with the first common cache memory unit, each of said first and second common cache memory units being not internal to any of the at least two bridge controllers;

initially storing on the first common cache memory unit all data to be stored in the mass memories; and then storing in the mass memories the data initially stored in the first common cache memory unit, wherein the data to be stored in the first common cache memory unit are mirrored on the second common cache memory unit, wherein the first and second common cache memory units have memory modules and can have their storage capacity extended by connecting at least one additional memory module or reduced by removing at least one of the memory modules, and wherein extending or reducing the storage capacity or connecting an additional common cache memory unit or removing a faulty common cache memory unit does not prompt a "cache flush" and the at least two bridge controllers remain in a "write back mode".

9. The method as claimed in claim 8,
wherein
the data to be stored are mirrored on the second common cache memory unit using a cache coherency algorithm which is based on a required security level.

10. The method as claimed in claim 8,
wherein
the second common cache memory adopts the functionality of the first common cache memory unit transparently and without delay in the event of failure of the first common cache memory unit.

11. The method as claimed in claim 8,
wherein
the first and second common cache memory units are incorporated in a memory subsystem manager for management purposes.

12. The method as claimed in claim 8,
wherein
the data stored in the first and second common cache memory units are protected against errors by means of protection algorithms for data reconstruction.

13. The method as claimed in claim 8,
wherein
the data to be stored are stored in the first and second common cache memory units in blocks, and the first and second common cache memory units have self-restoring properties which, in the event of failure of a block or in the event of a stipulated error level being exceeded, automatically map the data to be stored in a reserved block and do not use the faulty block further.

14. The method as claimed in claim 8,
wherein
status of the data to be stored in the mass memories is initially stored in the first common cache memory unit and then stored in the mass memories.

15. A method for operating a mass memory device having a plurality of mass memories and at least two bridge controllers which can be used to address the mass memories, the method comprising the steps of:
providing a first common cache memory unit associated with the at least two bridge controllers and a second common cache memory unit associated with the first common cache memory unit, each of said first and common cache memory units being not internal to any of the at least two bridge controllers;

initially storing on the first common cache memory unit all data to be stored in the mass memories; and then storing in the mass memories the data initially stored in the first common cache memory unit, wherein removal of one of the first and second common cache memory units does not prompt a "cache flush" and the at least two bridge controllers remain in a "write back mode", in which the data to be stored are first written to the other of the first and second common cache memory units and are then stored on the mass memories.

16. The method as claimed in claim 15,
wherein
the data to be stored in the first common cache memory unit are mirrored on the second common cache memory unit.

17. The method as claimed in claim 15,
wherein
the data to be stored are mirrored on the second common cache memory unit using a cache coherency algorithm which is based on a required security level.

18. The method as claimed in claim 15,
wherein
the second common cache memory adopts the functionality of the first common cache memory unit transparently and without delay in the event of failure of the first common cache memory unit.

19. The method as claimed in claim 15,
wherein
the first and second common cache memory units are incorporated in a memory subsystem manager for management purposes.

20. The method as claimed in claim 15,
wherein
the data stored in the first and second common cache memory units are protected against errors by means of protection algorithms for data reconstruction.

21. The method as claimed in claim 15,
wherein the data to be stored are stored in the first and second common cache memory units in blocks, and the first and second common cache memory units have self-restoring properties which, in the event of failure of a block or in the event of a stipulated error level being exceeded, automatically map the data to be stored in a reserved block and do not use the faulty block further.

22. A method for operating a mass memory device having a plurality of mass memories and at least two bridge controllers which can be used to address the mass memories, the method comprising the steps of:
providing a first common cache memory unit associated with the at least two bridge controllers, wherein said first common cache memory unit is not internal to any of the at least two bridge controllers;

initially storing on the first common cache memory unit all data to be stored in the mass memories; and then storing in the mass memories the data initially stored in the first common cache memory unit, wherein removal of the first common cache memory unit prompts a "cache flush" and the bridge controllers change over to a "write through mode", in which the data to be stored are stored directly on the mass memories.

* * * * *